(12) United States Patent
Cho

(10) Patent No.: US 7,443,935 B2
(45) Date of Patent: Oct. 28, 2008

(54) APPARATUS AND METHOD FOR DYNAMICALLY ADJUSTING RECEIVER BANDWIDTH

(75) Inventor: James B. Cho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1072 days.

(21) Appl. No.: 10/286,925

(22) Filed: Nov. 2, 2002

(65) Prior Publication Data

US 2004/0086063 A1    May 6, 2004

(51) Int. Cl.
*H04L 27/06* (2006.01)
*H04L 7/00* (2006.01)
(52) U.S. Cl. .................. 375/344; 375/355
(58) Field of Classification Search ........... 375/344, 375/355
See application file for complete search history.

(56) References Cited

U.S. PATENT DOCUMENTS

| | | | | |
|---|---|---|---|---|
| 4,527,278 A | * | 7/1985 | Deconche et al. | 375/344 |
| 5,267,273 A | * | 11/1993 | Dartois et al. | 375/355 |
| 2004/0071251 A1 | * | 4/2004 | Sutioso et al. | 375/373 |

* cited by examiner

*Primary Examiner*—Khai Tran
(74) *Attorney, Agent, or Firm*—Alan K. Stewart; W. James Brady; Frederick J. Telecky, Jr.

(57) ABSTRACT

An apparatus for adjusting bandwidth for a receiver includes: (a) a receiver clock operating according to receiver clock parameters related to received signals for sampling received signals; (b) a local clock; (c) a tracker receiving an indicator related to the receiver clock parameter and generating a tracking parameter for comparing the receiver clock parameter and periodicity of the local clock; (d) a counter for counting events associated with the tracking parameter and generating an event count relating to the received signals; (e) a decision unit for reckoning the event count and generate a decision parameter relating to the reckoning; and (f) output logic coupled with the decision unit, the tracker and the receiver clock for evaluating the decision parameter and the tracking parameter by a logical routine for determining a need for changing operation of the receiver clock and for generating a change signal when the need exists.

19 Claims, 4 Drawing Sheets

APPARATUS AND METHOD FOR DYNAMICALLY ADJUSTING RECEIVER BANDWIDTH

BACKGROUND OF THE INVENTION

The present invention is directed to receiver devices, and especially to telecommunication receiver devices. Receiver devices are commonly designed to receive signals at a predetermined carrier frequency. However, environmental and other influences can operate to somewhat alter the parameters of a received signal at a receiver device. For example, a carrier signal for an optical fiber telecommunication system may be designed at 2.5 GHz (gigahertz), but fiber cables can stretch or shrink because of temperature fluctuations so that a sort of Doppler effect can alter the phase of signals from the designed carrier signal as they arrive at a receiver device. As a consequence, receiver devices are often provided with a capability for noting certain characteristics of arriving signals in order to enable accurate interpretation of the received signals. Thus, receiver devices are often capable of ascertaining such signal characteristics as zero-crossings, leading edges, trailing edges or combinations of such characteristics. Such a capability permits a receiver device to ascertain a "receiver clock" periodicity for received signals. Accurately ascertaining the "receiver clock" for a received signal assures that the receiver device can properly interpret digital information conveyed in the received signal, accurately ascertaining how long a "1" lasts or a "0" lasts, and interpreting where "edges" occurs in the signaling.

Industry standards have become important in various technology areas to ensure that various manufacturers can produce products that are compatible with each other in the marketplace. This trend is beneficial to consumers in that it permits purchasing equipment form a variety of manufacturers without being limited to the technology of a particular producer. Telecommunications is a technology area that has experienced a significant degree of standards activity, including, by way of example, fiber optic telecommunication networks.

A prevalent standard for fiber optic telecommunications is the SONET (Synchronous Optical NETwork) standard. Among the parameters specified in the SONET standard are specifications regarding the telecommunication system's handling of jitter. Jitter is a manifestation of phase shift of digital pulses over a transmission medium, such as a fiber optic cable. As mentioned earlier herein, temperature fluctuations can operate to stretch or shrink optical cables so that the phase of signals is altered as they traverse the optical cable, thereby introducing jitter.

There are typically three measures of how well a telecommunication system handles jitter: (1) jitter generation—how much jitter a device or system generates when it is provided with a signal having zero jitter; (2) jitter transfer—when a data stream with a known amount of jitter is input to a device or system, how much jitter is present in data coming out of the device or system; and (3) jitter tolerance—how much jitter can an incoming data stream have before a device or system starts to "drop bits" (i.e., starts to misread data conveyed by the signal).

Jitter generation involves providing a quiet, accurate clock for a device or system. Jitter transfer involves providing a lower bandwidth for a device or system in order to reject noise. A practical consequence of such a lower bandwidth is that the device or system counts bits in received signals more slowly. Jitter tolerance involves providing a higher bandwidth for a device or system in order that the device or system can react more quickly to recognize and accommodate phase shifts in received signals. Thus, in order to meet established standards for a system (e.g., a SONET standard), one must set bandwidth low enough to meet jitter transfer standards while ensuring that bandwidth is high enough to meet the jitter tolerance specification; the two aspects of jitter accommodation (i.e., jitter transfer and jitter tolerance) require conflicting remedies, conflicting bandwidth requirements.

Ensuring jitter tolerance is sufficient to provide continuity of communications in a device or system is an important design aspect for a receiver device or system. It often occurs that one must adjust operating parameters of a device or system (e.g., bandwidth) temporarily out of compliance with a standard in order to provide the desired continuity of communications. One solution would be to provide a manual selection switch for a user of a device or system to select a higher or lower bandwidth as jitter tolerance must be altered to accommodate extant received signals. However, such a manual bandwidth selecting capability would be cumbersome and unreliable to operate.

There is a need for an automatic apparatus and method for dynamically adjusting bandwidth of a receiver device or system for automatically adjusting jitter tolerance of the receiver device or system.

SUMMARY OF THE INVENTION

An apparatus for adjusting bandwidth for a receiver includes: (a) a receiver clock operating according to receiver clock parameters related to received signals for sampling received signals; (b) a local clock; (c) a tracker receiving an indicator related to the receiver clock parameter and generating a tracking parameter for comparing the receiver clock parameter and periodicity of the local clock; (d) a counter for counting events associated with the tracking parameter and generating an event count relating to the received signals; (e) a decision unit for reckoning the event count and generate a decision parameter relating to the reckoning; and (f) output logic coupled with the decision unit, the tracker and the receiver clock for evaluating the decision parameter and the tracking parameter by a logical routine for determining a need for changing operation of the receiver clock and for generating a change signal when the need exists.

A method for dynamically adjusting receiver bandwidth for a receiver device receiving received signals in a communication system includes the steps of: (a) driving a receiver clock unit according to at least one receiver clock parameter for effecting sampling of the received signals; the at least one receiver clock parameter is affected by at least one feature of the received signals; (b) using at least one indicator related to the at least one receiver clock parameter for generating at least one tracking parameter; the at least one tracking parameter quantifies a comparison between the at least one receiver clock parameter and a local clock periodicity of a local clock unit; (c) counting events associated with the at least one tracking parameter to generate an event count indicating at least one characteristic relating to the received signals; (d) reckoning the event count to appraise the at least one characteristic; (e) generating at least one decision parameter relating to the reckoning; (f) evaluating the at least one decision parameter and the at least one tracking parameter according to a predetermined logical routine for determining whether a need exists for changing at least one of the at least one receiver clock parameter; and (g) generating at least one change signal to effect at least a portion of the changing when the evaluating indicates the need exists.

It is, therefore, an object of the present invention to provide an apparatus and method for dynamically adjusting bandwidth of a receiver device or system for automatically adjusting jitter tolerance of the receiver device or system.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
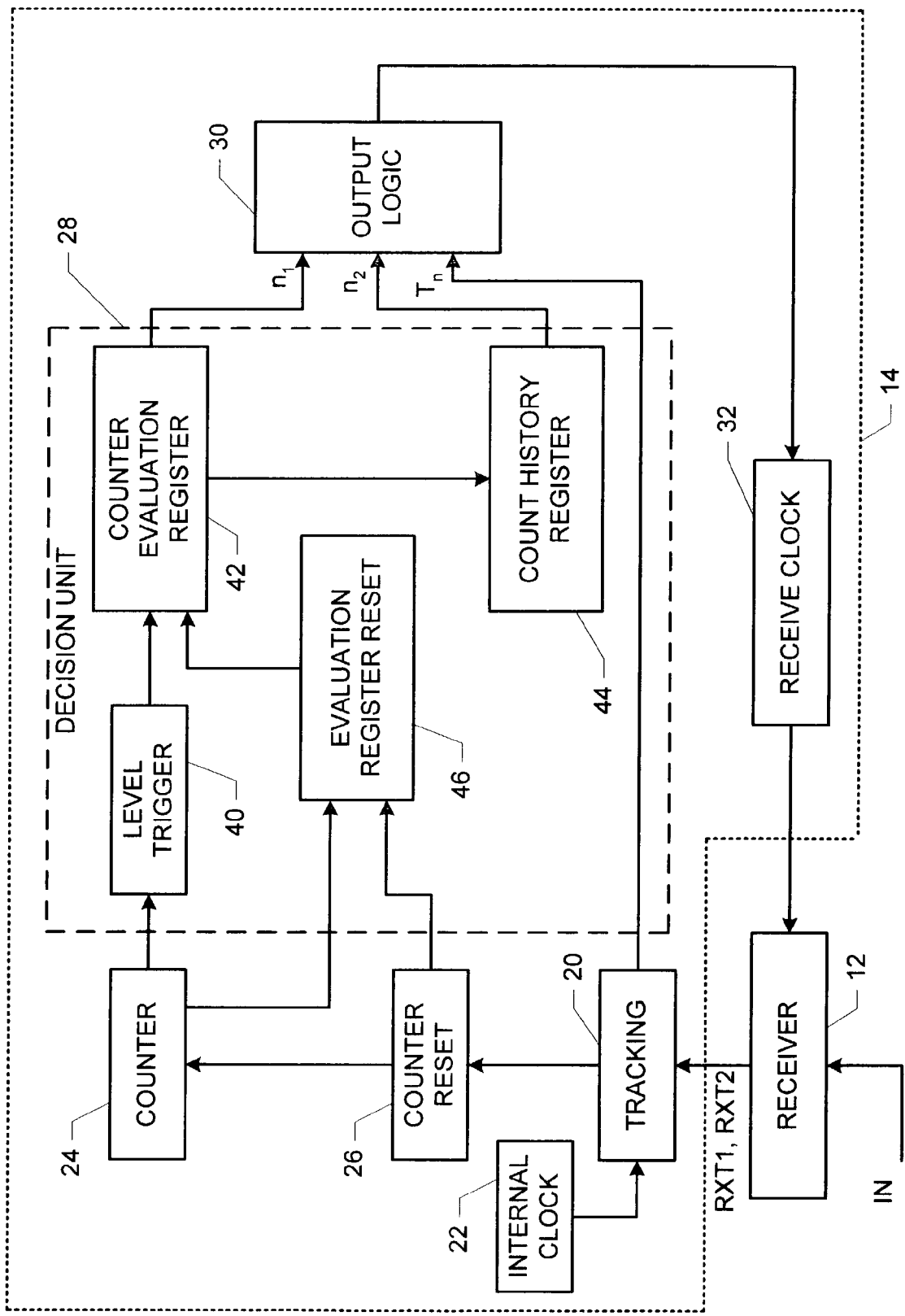
FIG. 1 is a schematic diagram illustrating the preferred embodiment of the apparatus of the present invention.

One type of apparatus for controlling operation of a receiver device in a telecommunication system is a phase locked loop based clock and data recovery (PLLCDR) apparatus. Configuring a PLLCDR apparatus for providing an adjustable bandwidth capability is difficult. Such a configuration involves PLL (phase locked loop) based recovery loops and requires external components to carry out loop filtering requirements for such an application. It would be advantageous to be able to provide an adjustable bandwidth configuration in a receiver device without having to rely upon external components so that stringent cost and space requirements often extant in the telecommunications marketplace may be satisfied.

Another apparatus for controlling operation of a receiver device in a telecommunication system is an interpolator based clock and data recovery (ICDR) loop. Prior art CDR loops (both PLLCDR and ICDR) have a fixed bandwidth so that a single bandwidth had to be selected in designing a CDR loop for a telecommunication system that would satisfy (in so far as possible) the three jitter specifications: jitter generation, jitter transfer and jitter tolerance.

Users of receiver devices in some telecommunication systems, such as by way of example and not by way of limitation, SONET telecommunication systems, have encountered circumstances in which jitter tolerance of their SONET-compliant systems (i.e., the telecommunication system conforms to the SONET standard) has been too low. That is, received signals have contained too much jitter for their systems to reliably recover data from those received signals. There is a problem, however, in that adjusting the bandwidth of the receiver devices associated with those systems to a higher value in order to accommodate the jitter in the received signals causes the receiver device to be non-compliant with the SONET standard. That is, customer requests to manufacturers for improving the jitter tolerance of a receiver device requires increasing the bandwidth of the receiver device to a value that causes other requirements of the SONET standard to not be satisfied. A manufacturer desires to produce equipment that satisfies the standard or standards that apply to the equipment. To attempt to produce and sell non-standard-compliant equipment is to embark upon a path to ruin with small segmented and specialized markets (if indeed there are any markets for such equipment). Economies of scale are lost and cost of manufacture rises, leading to unprofitable operations.

Conditions of excessive jitter exceeding the jitter tolerance of a device or system are often transitory. Accordingly, to maintain communication integrity (i.e., to reliably receive and accurately interpret data contained in received signals) a device or system must only stray momentarily from an established standard in order to accommodate errant (high jitter) signals. A device or system having such a capability to automatically respond to and accommodate high jitter in received signals, while automatically returning to a nominal bandwidth value during periods experiencing lesser jitter, may be designed to remain a standards-compliant device or system except for during such accommodating intervals. The present invention provides an apparatus and method by which a device or system may respond to errant received signals to configure in a non-compliant manner in transitory circumstances requiring such straying for purposes of maintaining operation integrity and solid communications. Manufacturers of such automatically adjustable equipment may thereby continue to market their devices and systems as standards-compliant, but the devices or systems provide enhanced reliability under a wider range of jitter conditions in received signals.

ICDR (interpolator based clock and data recovery) loops may be configured to sample the received signals at a sample interval, a larger interval means that samples are taken less frequently. Another parameter involved in the operation of an ICDR loop is the size of step taken in effecting a change for each interpolator update. The present invention alters bandwidth of an ICDR loop by changing one, or the other, or both of the sample interval and the step size.

FIG. 1 is a schematic diagram illustrating the preferred embodiment of the apparatus of the present invention. In FIG. 1, a communication receiver system 10 includes a receiver device 12 and a bandwidth adjusting apparatus 14. Bandwidth adjusting apparatus 14 includes a tracking unit 20 and an internal clock unit 22. Tracking unit 20 is coupled with receiver device 12 and with internal clock unit 22. Bandwidth adjusting apparatus 14 also includes a counter unit 24 and a counter reset unit 26. Counter reset unit 26 is coupled with tracking unit 20 and with counter unit 24.

Bandwidth adjusting apparatus 14 further includes a decision unit 28 coupled with counter unit 24, with counter reset unit 26 and with an output logic unit 30. Output logic unit 30 is also coupled with tracking unit 20. Further included in bandwidth adjusting unit 14 is a receive clock 32 coupled with output logic unit 30 and with receiver device 12.

Decision unit 28 includes a level trigger unit 40 coupled with counter 24, a counter evaluation register 42 coupled with level trigger unit 40, a count history register 44 coupled with counter evaluation register 42 and an evaluation register reset unit 46 coupled with counter 24, with counter reset unit 26 and with counter evaluation register 42. Output logic unit 30 is coupled with counter evaluation register 42, with count history register 44 and with tracking unit 20.

Bandwidth adjusting apparatus 14 is preferably configured as an interpolator-based clock and data recovery (ICDR) circuit having a bandwidth that is adjustable by changing duration of an interval between each interpolator update (i.e., intervals between samplings of received signals arriving at receiver device 12), or adjustable by changing the amount of change that is introduced with each interpolator update (i.e., "step" size of adjustments made at each interpolator update), or adjustable by changing both update interval duration and step size. In the preferred embodiment of bandwidth adjusting apparatus 14, the interpolator employs M sectors (preferably between 2 and 16 sectors) and a multi-bit "thermometer" code (preferably between 16 and 64 bits). The sector in use and the state of the thermometer code indicates which two local clock phases (represented by a single internal clock 22 in FIG. 1) are mixed to form the recovered clock based upon timing of signals received by receiving device 12. As bandwidth adjusting apparatus 14 operates, an interpolator (not shown in detail in FIG. 1) is updated once every N nanoseconds. The value of N and the number of steps taken in each update (represented by shifting the thermometer codes) determine the bandwidth of the ICDR circuit. One may adjust N to a higher value (thereby increasing the interval between updates) to establish a smaller bandwidth, or one may decrease the value of N (thereby shortening the interval between updates) to establish a larger bandwidth. Altering the value of N is carried out in the preferred embodiment of the apparatus (FIG. 1) by altering the interval at which the sampling circuit (not shown in FIG. 1) samples the signal received from tracking unit 20. Step size for changes to be effected at the established intervals is carried out in the preferred embodiment of the apparatus (FIG. 1) by shifting thermometer codes one or more bits at a time, thus altering the steps required to cross a sector.

In such a configuration, a user may effect automatic adjustment of the bandwidth of an interpolator-based Clock and Data Recovery (ICDR) circuit to accomplish enhanced jitter tolerance of a receiver device only when such enhanced jitter tolerance is required. The receiver device can remain conforming to an established standard (e.g., a SONET standard) at other times when such enhanced jitter tolerance is not required.

Bandwidth adjusting apparatus 14 operates by using tracking unit 20 for receiving from receiver device 12 at least one indicator relating to a receiver clock parameter relating to the received signal arriving at receiver device 12 and relating to receiver clock 32. In the preferred embodiment of bandwidth adjusting apparatus 14, tracking unit 20 is used for detecting the amount of time it takes for the clock embedded in the serial data stream of the received signal arriving at receiver device 12 to shift by a predetermined amount (e.g., 1/M of a cycle—enough to cross a sector of the interpolator of the CDR loop) relative to the local clock signal provided by internal clock unit 22. In the preferred embodiment of bandwidth adjusting apparatus 14, tracking unit 20 receives indicator signals RXT1, RXT2 from the interpolator control mechanism (not shown in FIG. 1). Signals RXT1, RXT2 represent the least significant bit (LSB) and the most significant bit (MSB) presently extant in the thermometer register included in the interpolator control mechanism (not shown in detail in FIG. 1) that is used to control interpolator operation.

Tracking unit 20 generates at least one tracking parameter for quantifying a comparison between the at least one indicator and local clock periodicity of internal clock unit 22. In the preferred embodiment of bandwidth adjusting apparatus 14 the at least one tracking parameter is a two-bit value which is set, by way of example and not by way of limitation, at a value of 00 to establish N at a high value (for a longer interval; smaller bandwidth) if the frequency difference between the embedded receive clock and internal clock unit 22 is small. If the frequency difference between the embedded receive clock and internal clock unit 22 is not small, yet not so great as to indicate a need for altering jitter tolerance, the two-bit value may be set at 01 to set N at a lower value (a somewhat shorter interval). If the difference between the embedded receive clock and internal clock unit 22 is great enough to indicate a need for adjusting jitter tolerance, then the two-bit value may be set at 11 to set N at its lowest value (shortest interval) and cause the thermometer register to shift more than one bit per step. These digital values representing various levels of difference between the embedded receive clock and internal clock unit 22 are representative. Other values, more numerous levels of adjustment, fewer levels of adjustment or combinations of such variations may be employed while remaining within the intended scope of the present invention.

Counter reset unit 26 resets counter unit 24 according to predetermined conditions. For example, counter reset unit 26 may reset counter unit 24 whenever an indicator received by tracking unit 20 from receiver device 12 indicates that the thermometer register is holding all 0's or all 1's. The thermometer register stores present values and selected historical values for thermometer codes. The thermometer register is not shown in detail in FIG. 1 and may be located in tracking unit 20 or elsewhere in bandwidth adjusting apparatus 14 or externally of bandwidth adjusting apparatus 14. By way of example and not by way of limitation, if tracking unit 20 receives two-bit indicator signals RXT1, RXT2 from the thermometer register, when signals RXT1, RXT2 reach 0,0 or 1,1 indication is established that the thermometer register is holding all 0's or all 1's. Logical circuitry may be included in tracking unit 20 to further indicate whether the thermometer codes are all 1's presently and were all 0's at the beginning of an analysis cycle, or if the thermometer codes are all 0's now and were all 1's at the beginning of the analysis cycle. Such a capability to compare historical values with present values in the thermometer register enables bandwidth adjusting apparatus 14 to discern if a particular sector boundary is being crossed repeatedly. If a particular sector boundary is being recrossed with no other sector boundary having been crossed in the interim, no adjustment is effected in N or in thermometer code step size.

Level trigger 40 keeps track of how high a count is reached by counter unit 24. Level trigger unit 40 cooperates with counter unit 24 for indicating events associated with the at least one tracking parameter generated by tracking unit 20. Such counting to keep track of events as they occur within bandwidth adjusting apparatus 14 provides information regarding the responsiveness of receiver device 12 to received signals by indicating how quickly receiver device 12 is having to adjust to accommodate varied timing embedded in received signal. If there is a significant amount of adjusting by receiver device 12, there is significant variation (i.e., jitter) in received signals that may need to be accommodated (i.e., jitter tolerance may need to be enhanced). Thus, counter unit 24 and level trigger 40 cooperate to indicate how much jitter is received by receiver unit 12. Counter evaluation register 42 uses information received from level trigger 40 to provide an input to output logic unit 30 for determining what should be adjusted: N, step size, or both N and step size. Information provided by counter evaluation register 42 to output logic unit 30 indicates results of an evaluation of certain levels of the count or counts $n_1$, $n_2$ detected by counter unit 24 and level trigger 40 during the time it takes for the interpolator to cross one sector. That is, the count or counts $n_1$, $n_2$ evaluated by counter evaluation register 42 indicate how quickly receiver device 12 is changing to accommodate jitter in received signals. Count history register 44 is used to keep track of what jitter levels existed during past evaluations. Counter reset unit 26 cooperates with counter unit 24 to trigger evaluation register reset unit 46 to prepare count evaluation register 42 for a new evaluation cycle.

Output logic unit 30 receives count evaluation $n_1$, $n_2$ from decision unit 28. Output logic unit 30 also receives a signal $T_n$ from tracking unit 20 indicating a parameter related to presently extant conditions of operation in receiver device 12. Providing a presently extant parameter to output logic unit 30 permits incorporating operation of receiver device 12 over a period of time (represented by count evaluation $n_1$, $n_2$) and also to take into account present operational aspects of receiver device 12 (represented by signal $T_n$) in-determining what adjustments are necessary for receiver clock 32. For example, if a first predetermined count evaluation $n_{11}$, $n_{21}$ (generated by counter 24, level trigger unit 40, counter evaluation register 42 and count history register 44) is achieved during a first period and a first signal $T_1$ indicates that no new adjustments have occurred during that first period for accommodating variations in the signal received at receiver device 12, a first condition is extant in output logic unit 30. By way of further example, if a second predetermined count evaluation $n_{12}$, $n_{22}$ is achieved during a second period and a second signal $T_2$ indicates that a predetermined number of new adjustments have occurred during that second period for accommodating variations in the signal received at receiver device 12, a second condition is extant in output logic unit 30. In such manner, the recent history of conditions in receiver device 12 and presently extant conditions in receiver device 12 are used for deciding when enhanced jitter tolerance is required so that bandwidth of receiver clock 32 may be altered to achieve the required bandwidth adjustment. Adjustment of bandwidth may occur in more than one iteration, depending upon the value of N and the step value extant during the adjustment process.

Thus, bandwidth adjusting apparatus 14 may be regarded as including receiver cock unit 32 and an extant condition sampling unit made up of tracking unit 20 and internal clock 22. The extant condition sampling unit thus described provides at least one indication regarding presently extant conditions in receiver device 12. This alternate description of bandwidth adjusting apparatus 14 may further be regarded as having a sample register unit that includes counter unit 24, counter reset unit 26 and decision unit 28. The sample register unit thus described provides at least one indication regarding recent history of conditions in receiver device 12. In this alternate description of bandwidth adjusting apparatus 14, output logic unit 30 may still employ the recent history of conditions in receiver device 12 and presently extant conditions in receiver device 12 for deciding when enhanced jitter tolerance is required so that bandwidth of receiver clock 32 may be altered to achieve the required bandwidth adjustment.

Figure 2:
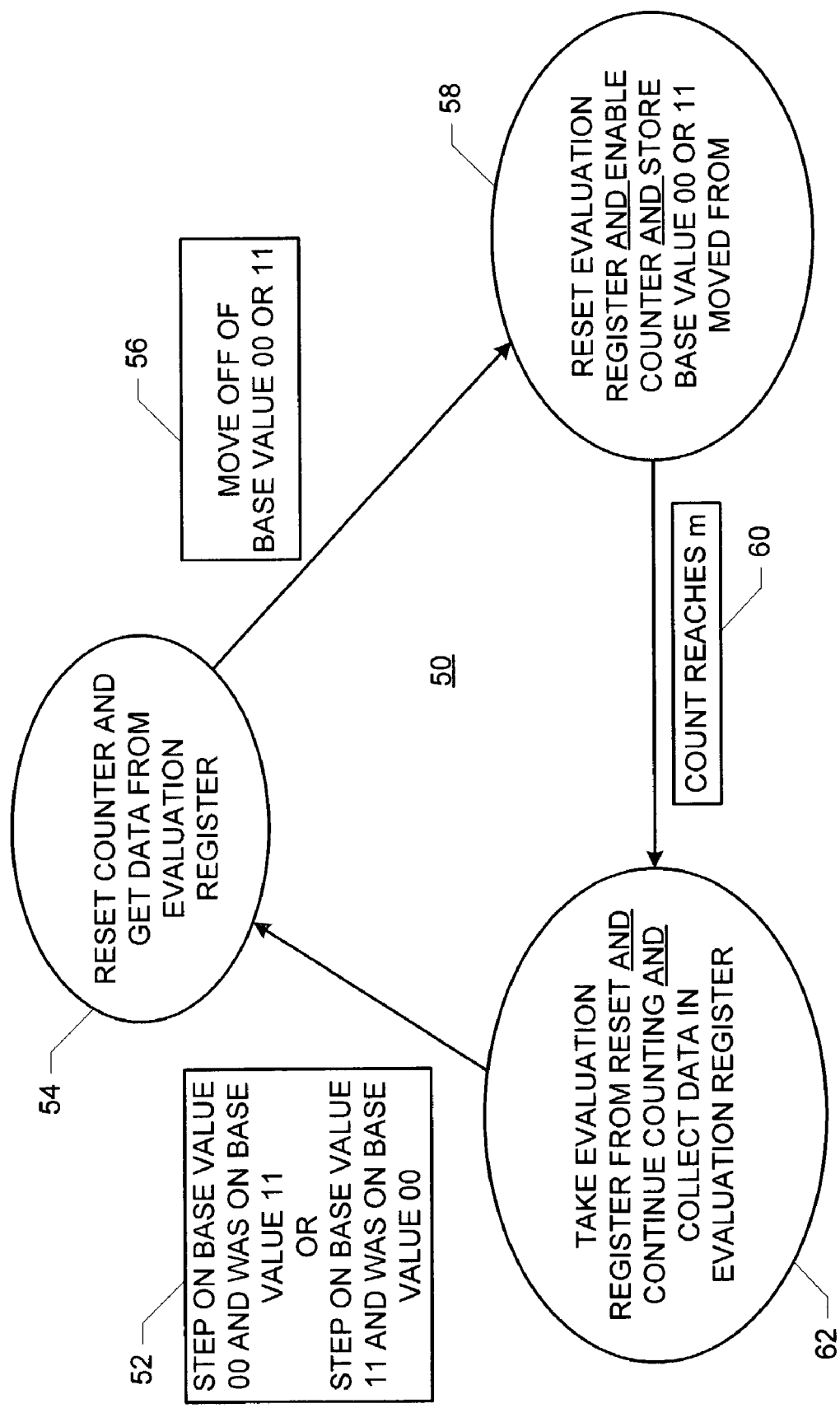
FIG. 2 is a state diagram illustrating operation of the bandwidth adjusting apparatus of the preferred embodiment of the present invention illustrated in FIG. 1.

FIG. 2 is a state diagram illustrating operation of the bandwidth adjusting apparatus of the preferred embodiment of the present invention illustrated in FIG. 1. In FIG. 2, state diagram 50 illustrates that bandwidth adjusting apparatus 14 (FIG. 1) resets counter unit 24 and output logic unit 30 gets data from counter evaluation register 42 and count history register 44 (as indicated by a state 54) in one of two situations: (1) when the current step level is at a base value 00 (the base value indicates the values of RXT1, RXT2, which are the MSB and LSB of the thermometer code, as described earlier herein) and was previously at a base value 11, or (2) when the current step level is at a base value 11 and was previously at a base value 00, as indicated by a condition notation 52. By observing conditions indicated in condition notation 52, bandwidth adjusting apparatus 14 may distinguish whether a new sector boundary has been crossed rather than noting a repeated recrossing of a single sector boundary.

Bandwidth adjusting apparatus 14 changes from state 54 to a new state 58 upon occurrence of step value moving from base value 00 or 11 (indicated by a condition notation 56). When in state 58, bandwidth adjusting apparatus 14 resets counter evaluation register 42 and enables counter unit 24 to resume counting. State 58 also provides for storing whichever base value has been moved from in fulfilling condition notation 56. This storing of base value moved from enables bandwidth adjusting apparatus 14 to keep track of whether new sector boundaries are crossed or whether a single sector boundary is recrossed.

When level trigger unit 40 notes that counter unit 24 reaches a predetermined count level m (as indicated by a condition notation 60), bandwidth adjusting apparatus 14 changes from state 58 to a new state 62. In the preferred embodiment of bandwidth adjusting apparatus 14, m is equal to 2. Thus, counter evaluation register 42 enters state 62 after counter unit 24 has reached the count of 2. When in state 62, evaluation register 42 is taken out of reset and counter unit 24 is allowed to continue counting. In state 62, if counter unit 24 reaches a predetermined value, level trigger unit 40 will signal evaluation register 42 that jitter enhancement is not needed.

Bandwidth adjusting apparatus 14 continues operating as earlier described when conditions in condition notation 52 are satisfied by changing to state 54 in which state tracking unit 20 resets counter unit 24 and output logic unit 30 gets data from counter evaluation register 42.

Figure 3:
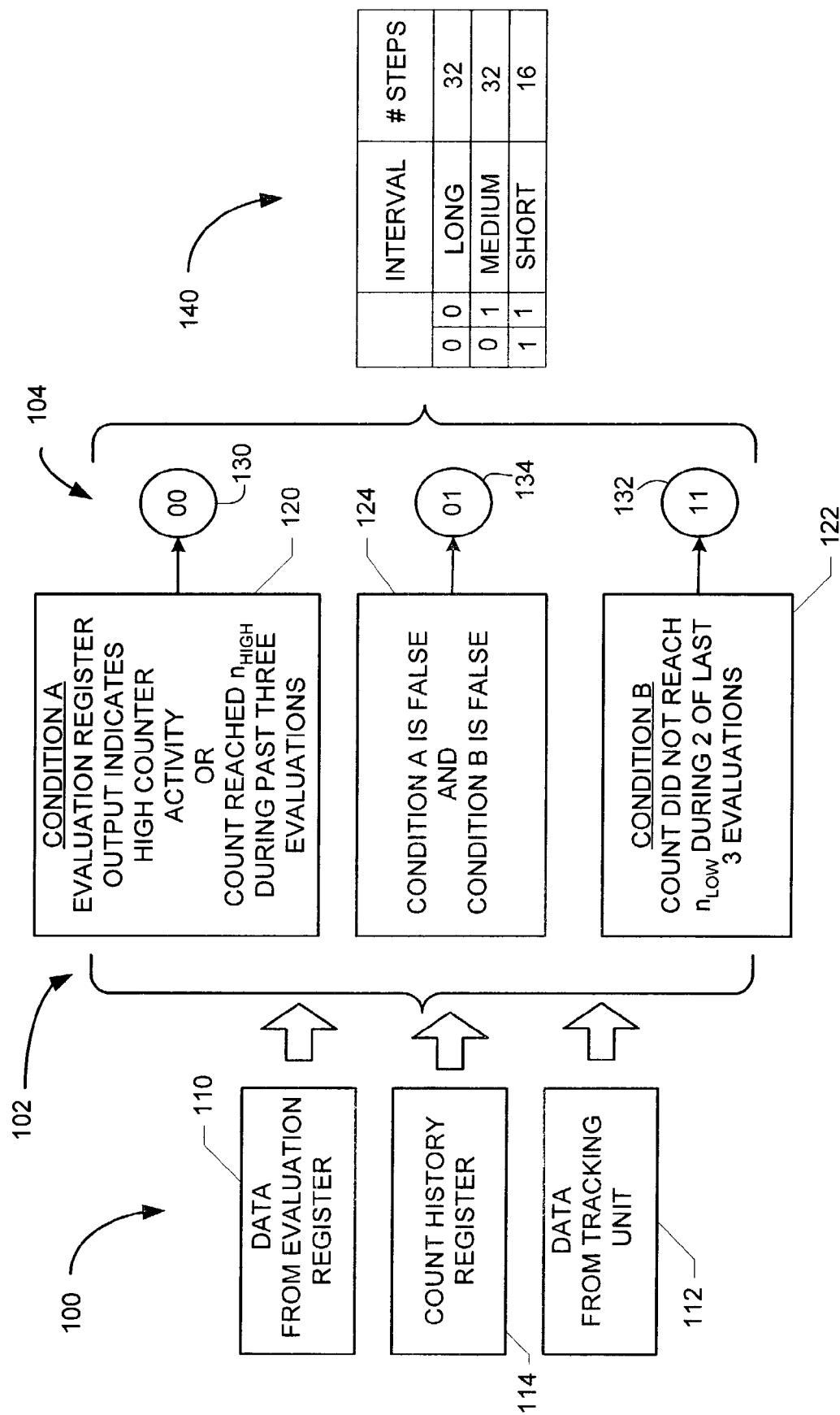
FIG. 3 is a state diagram illustrating operation of the decision and output logic units of the preferred embodiment of the present invention illustrated in FIG. 1.

FIG. 3 is a state diagram illustrating operation of the decision and output logic units of the preferred embodiment of the present invention illustrated in FIG. 1. In FIG. 3, data inputs 100 are provided to a decision stage 102, and decision stage 102 drives an output stage 104. Data inputs include data from counter evaluation register 42 as indicated by a block 110, data from count history register 44 as indicated by a block 114 and data from tracking unit 20 as indicated by a block 112.

Decision stage 102 represents logical evaluations made using data provided from data inputs 100. Thus, decision stage 102 evaluates whether a Condition A has been satisfied, as indicated by a block 120. Condition A requires that output from evaluation register 42 indicates a high level of counter activity or counter unit 24 has reached a predetermined high count level $n_{HIGH}$ during the last three evaluation cycles. If Condition A is satisfied, decision stage 102 generates an output 00, as indicated at an output locus 130.

Decision stage 102 further evaluates whether a Condition B has been satisfied, as indicated by a block 122. Condition B requires that counter unit 24 not reach a predetermined low count level $n_{LOW}$ during two of the most recent three evaluation cycles. The preferred embodiment of the present invention establishes high count level $n_{LOW}$ at a value lower than $n_{HIGH}$. If Condition B is satisfied, decision stage 102 generates an output 11, as indicated at an output locus 132.

If neither Condition A nor Condition B are satisfied, decision stage 102, as indicated by a block 124, decision stage 102 generates an output 01, as indicated at an output locus 134.

The resulting actions occasioned by outputs indicated at output loci 130, 132, 134 are illustrated in output results chart 140. Thus, an output 00 (output locus 130) indicating that Condition A is satisfied results in imposing a long interval (high value for N) and step changes being carried out in a first predetermined number of steps, such as 32 steps. In this context, the number of steps relates to how many steps are required to cross a sector boundary. An output 11 (output locus 132) indicating that Condition B is satisfied results in imposing a short interval (low value for N) and step changes being carried out in a second predetermined number of steps, such as 16 steps. An output 01 (output locus 134) indicating that neither Condition A nor Condition B is satisfied results in imposing a medium interval (medium value for N) and step changes being carried out in a third predetermined number of steps, which is 32 steps in the embodiment illustrated in FIG. 3.

It is worthy of note that a simpler implementation is possible in which Condition A is not checked. In such an implementation, output stage 104 would involve providing a single-bit indication whether bandwidth should be set to a high value or a low value. It is contemplated that the scope of the present invention shall include such a simplified implementation.

Figure 4:
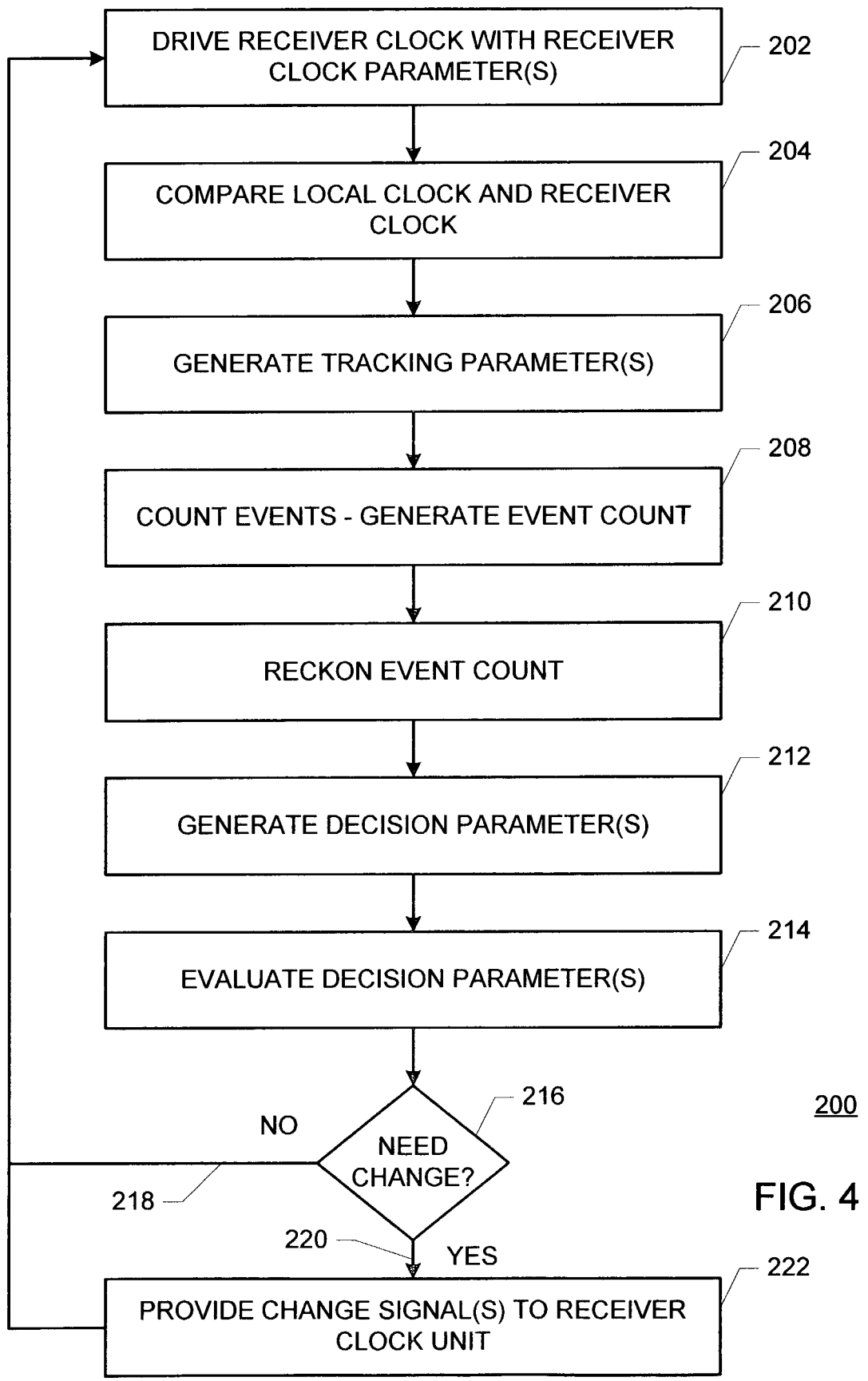
FIG. 4 is a flow diagram illustrating the preferred embodiment of the method of the present invention.

FIG. 4 is a flow diagram illustrating the preferred embodiment of the method of the present invention. In FIG. 4, a method 200 for dynamically adjusting receiver bandwidth for a receiver device receiving received signals in a communication system begins with driving a receiver clock unit according to at least one receiver clock parameter for effecting sampling of the received signals, as indicated by a block 202. The at least one receiver clock parameter is affected by at least one feature of the received signals. Method 200 continues by comparing local clock periodicity of a local clock with at least one receiver clock parameter associated with the receiver device, as indicated by a block 204.

Method 200 continues by using at least one indicator related to the at least one receiver clock parameter for generating at least one tracking parameter, as indicated by a block 206. The at least one tracking parameter quantifies the comparison between the at least one receiver clock parameter and the local clock periodicity of the local clock unit effected pursuant to the step represented by block 204.

Method 200 further continues by counting events associated with the at least one tracking parameter to generate an event count indicating at least one characteristic relating to the received signals, as indicated by a block 208. Method 200 continues by reckoning the event count to appraise the at least one characteristic, as indicated by a block 210. Method 200 further continues by generating at least one decision parameter relating to the reckoning, as indicated by a block 212.

Method 200 continues by evaluating the at least one decision parameter and the at least one tracking parameter according to a predetermined logical routine, as indicated by a block 214. Method 200 further continues by querying whether a need exists for changing at least one of the at least one receiver clock parameter, as represented by a query block 216. If no need exists for changing at least one of the at least one receiver clock parameter, method 200 proceeds according to NO response line 218 to continue driving the receiver clock with existing receiver clock parameter(s) (block 202). If a need exists for changing at least one of the at least one receiver clock parameter, method 200 proceeds according to YES response line 220 and at least one change signal is provided to the receiver clock unit to effect at least a portion of the changing. The receiver clock is thereafter driven with the changed receiver clock parameter(s) (block 202), and method 200 continues as described and as represented by blocks 202, 204, 206, 208, 210, 212, 214, 216, 222.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for dynamically adjusting receiver bandwidth for a receiver device receiving received signals in a communication system; the apparatus comprising:

(a) a receiver clock unit coupled with said receiver device for driving said receiver device; said receiver clock unit operating according to at least one receiver clock parameter for effecting sampling of said received signals; said at least one receiver clock parameter being affected by at least one feature of said received signals;

(b) a local clock unit operating according to a local clock periodicity;

(c) a tracking unit coupled with said receiver device and with said local clock unit; said tracking unit receiving from said receiver device at least one indicator related to said at least one receiver clock parameter; said tracking unit generating at least one tracking parameter for quantifying a comparison between said at least one receiver clock parameter and said local clock periodicity;

(d) a counter unit coupled with said tracking unit; said counter unit counting events associated with said at least one tracking parameter; said counter unit generating an event count indicating at least one characteristic relating to said received signals;

(e) a decision unit coupled with said counter unit; said decision unit reckoning said event count to appraise said at least one characteristic; said decision unit generating at least one decision parameter relating to said reckoning; and (f) an output logic unit coupled at least with said decision unit, said tracking unit and said receiver clock unit; said output logic unit evaluating said at least one decision parameter and said at least one tracking parameter according to a predetermined logical routine for determining whether a need exists for changing said operating of said receiver clock unit; said output logic unit generating at least one change signal to effect at least a portion of said changing when said evaluating indicates said need exists.

2. An apparatus for dynamically adjusting receiver bandwidth for a receiver device receiving received signals in a communication system as recited in claim 1 wherein said receiver clock unit operates at a receiver clock speed, and wherein said at least one receiver clock parameter includes a sampling frequency and a step-size; said sampling frequency affecting frequency of said sampling of said received signals; said step-size affecting size of change for alteration of said receiver clock speed; said changing affecting at least one of said sampling frequency and said step-size.

3. An apparatus for dynamically adjusting receiver bandwidth for a receiver device receiving received signals in a communication system as recited in claim 1 wherein said receiver clock unit operates at a receiver clock speed, and wherein said at least one receiver clock parameter includes a sampling frequency and a step-size; said sampling frequency affecting frequency of said sampling of said received signals; said step-size affecting size of change for alteration of said receiver clock speed; said changing affecting said sampling frequency and said step-size.

4. An apparatus for dynamically adjusting receiver bandwidth for a receiver device receiving received signals in a communication system as recited in claim 1 wherein said at least one decision parameter is a plurality of decision parameters; said at least one change signal being a selected change signal from among a plurality of change signals; respective change signals of said plurality of change signals each effecting a respective portion of said changing.

5. An apparatus for dynamically adjusting receiver bandwidth for a receiver device receiving received signals in a communication system as recited in claim 2 wherein said at least one decision parameter is a plurality of decision parameters; said at least one change signal being a selected change signal from among a plurality of change signals; respective change signals of said plurality of change signals each effecting a respective portion of said changing.

6. An apparatus for dynamically adjusting receiver bandwidth for a receiver device receiving received signals in a communication system as recited in claim 3 wherein said at least one decision parameter is a plurality of decision parameters; said at least one change signal being a selected change signal from among a plurality of change signals; respective change signals of said plurality of change signals each effecting a respective portion of said changing.

7. An apparatus for dynamically adjusting receiver bandwidth for a receiver device receiving received signals in a communication system as recited in claim 4 wherein each said respective portion of said changing involves changing a sampling frequency a predetermined sampling frequency change amount and changing said step-size a predetermined step-size change amount.

8. An apparatus for dynamically adjusting receiver bandwidth for a receiver device receiving received signals in a communication system as recited in claim 5 wherein each said respective portion of said changing involves changing said sampling frequency a predetermined sampling frequency change amount and changing said step-size a predetermined step-size change amount.

9. An apparatus for dynamically adjusting receiver bandwidth for a receiver device receiving received signals in a communication system as recited in claim 6 wherein each said respective portion of said changing involves changing said sampling frequency a predetermined sampling frequency change amount and changing said step-size a predetermined step-size change amount.

10. An apparatus for dynamically adjusting jitter tolerance of a receiver device receiving received signals in a communication system; the apparatus comprising:
   (a) a receiver clock unit coupled with said receiver device; said receiver clock operating according to at least one receiver clock parameter for effecting sampling of said received signals;
   (b) a local clock unit operating according to a local clock periodicity;
   (c) a tracking unit coupled with said receiver clock unit and with said local clock unit; said tracking unit receiving from said receiver clock unit at least one indicator related to said sampling; said tracking unit generating at least one tracking parameter indicating a relationship between said sampling and said local clock periodicity;
   (d) a counter unit coupled with said tracking unit; said counter unit counting events associated with said at least one tracking parameter; said counter unit generating an event count indicating at least one characteristic relating to said received signals;
   (e) a decision unit coupled with said counter unit; said decision unit reckoning said event count; said decision unit generating at least one decision parameter relating to said reckoning; and
   (f) an output logic unit coupled with said decision unit, said tracking unit and said receiver clock unit; said output logic unit applying a predetermined logic routine to evaluate said at least one decision parameter and said at least one tracking parameter for determining whether a need exists for changing at least one of said at least one receiver clock parameter; said output logic unit generating at least one change signal to effect at least a portion of said changing when said evaluating indicates said need exists.

11. An apparatus for dynamically adjusting jitter tolerance of a receiver device receiving received signals in a communication system as recited in claim 10 wherein said receiver clock unit operates at a receiver clock speed, and wherein said at least one receiver clock parameter includes a sampling frequency and a step-size; said sampling frequency affecting frequency of said sampling of said received signals; said step-size affecting size of change for alteration of said receiver clock speed; said changing affecting at least one of said sampling frequency and said step-size.

12. An apparatus for dynamically adjusting jitter tolerance of a receiver device receiving received signals in a communication system as recited in claim 10 wherein said at least one decision parameter is a plurality of decision parameters; said at least one change signal being a selected change signal from among a plurality of change signals; respective change signals of said plurality of change signals each effecting a respective portion of said changing.

13. An apparatus for dynamically adjusting jitter tolerance of a receiver device receiving received signals in a communication system as recited in claim 11 wherein said at least one decision parameter is a plurality of decision parameters; said at least one change signal being a selected change signal from among a plurality of change signals; respective change signals of said plurality of change signals each effecting a respective portion of said changing.

14. An apparatus for dynamically adjusting jitter tolerance of a receiver device receiving received signals in a communication system as recited in claim 12 wherein each said respective portion of said changing involves changing a sampling frequency a predetermined sampling frequency change amount and changing said step-size a predetermined step-size change amount.

15. An apparatus for dynamically adjusting jitter tolerance of a receiver device receiving received signals in a communication system as recited in claim 13 wherein each said respective portion of said changing involves changing said sampling frequency a predetermined sampling frequency change amount and changing said step-size a predetermined step-size change amount.

16. A method for dynamically adjusting receiver bandwidth for a receiver device receiving received signals in a communication system; the method comprising the steps of:
   (a) driving a receiver clock unit according to at least one receiver clock parameter for effecting sampling of said received signals; said at least one receiver clock parameter being affected by at least one feature of said received signals;
   (b) using at least one indicator related to said at least one receiver clock parameter for generating at least one tracking parameter; said at least one tracking parameter quantifying a comparison between said at least one receiver clock parameter and a local clock periodicity of a local clock unit;
   (c) counting events associated with said at least one tracking parameter to generate an event count indicating at least one characteristic relating to said received signals;
   (d) reckoning said event count to appraise said at least one characteristic;
   (e) generating at least one decision parameter relating to said reckoning;
   (f) evaluating said at least one decision parameter and said at least one tracking parameter according to a predetermined logical routine for determining whether a need exists for changing at least one of said at least one receiver clock parameter; and (g) providing at least one change signal to said receiver clock unit to effect at least a portion of said changing when said evaluating indicates said need exists.

17. A method for dynamically adjusting receiver bandwidth for a receiver device receiving received signals in a communication system as recited in claim 16 wherein said receiver clock unit operates at a receiver clock speed, and wherein said at least one receiver clock parameter includes a sampling frequency and a step-size; said sampling frequency affecting frequency of sampling said received signals; said step-size affecting size of change for alteration of said receiver clock speed; said changing affecting at least one of said sampling frequency and said step-size.

18. A method for dynamically adjusting receiver bandwidth for a receiver device receiving received signals in a communication system as recited in claim 16 wherein said at least one decision parameter is a plurality of decision parameters; said at least one change signal being a selected change signal from among a plurality of change signals; respective change signals of said plurality of change signals each effecting a respective portion of said changing.

19. A method for dynamically adjusting receiver bandwidth for a receiver device receiving received signals in a communication system as recited in claim 17 wherein said at least one decision parameter is a plurality of decision parameters; said at least one change signal being a selected change signal from among a plurality of change signals; respective change signals of said plurality of change signals each effecting a respective portion of said changing.

\* \* \* \* \*